United States Patent [19]

Goscenski, Jr.

[11] Patent Number: 4,974,714
[45] Date of Patent: Dec. 4, 1990

[54] CLUTCH ASSEMBLY AND IMPROVED LOW PRESSURE CONTROL THEREFOR

[75] Inventor: Edward J. Goscenski, Jr., Battle Creek, Mich.

[73] Assignee: Eaton Corporation, Cleveland, Ohio

[21] Appl. No.: 475,059

[22] Filed: Feb. 5, 1990

[51] Int. Cl.$^5$ .................. F16D 13/75; F16D 25/08
[52] U.S. Cl. .................. 192/85 CA; 192/85 R; 192/111 A; 475/86
[58] Field of Search .......... 192/85 AA, 85 V, 85 R, 192/111 A, 85 CA; 475/86

[56] References Cited

U.S. PATENT DOCUMENTS

| | | | |
|---|---|---|---|
| 2,991,664 | 7/1961 | Bernotas | 475/86 |
| 3,894,446 | 7/1975 | Snoy et al. | 475/88 |
| 4,412,459 | 11/1983 | Goscenski | 475/86 |
| 4,653,272 | 3/1987 | Sibeud et al. | 192/11 A X |

Primary Examiner—Rodney H. Bonck
Attorney, Agent, or Firm—L. J. Kasper

[57] ABSTRACT

A clutch assembly (35) is disclosed of the type which can retard rotation of an output member (27) relative to an input member (33). The clutch assembly includes discs (59, 61) fixed for rotation with the input and output members, respectively. Also included is a clutch apply piston (63) which defines a high pressure chamber (67), the apply piston being responsive to pressure in the high pressure chamber to apply a biasing force to the clutch discs. A low pressure piston (69) defines a low pressure chamber (79), the low pressure piston having a transverse area (A) and also including a secondary piston portion (71) extending axially into the high pressure chamber and having a transverse area (B) the volume of the high pressure chamber (67) is maintained substantially constant by a chamber piston (65) and a one-way clutch assembly (93). Changes in pressure in the low pressure chamber (79) result in amplified changes in pressure in the high pressure chamber (67) in a ratio approximately equal to the ratio of the transverse area (A) to the transverse area (B).

14 Claims, 3 Drawing Sheets

CLUTCH ASSEMBLY AND IMPROVED LOW PRESSURE CONTROL THEREFOR

BACKGROUND OF THE DISCLOSURE

The present invention relates to differential mechanisms, and more particularly, to such mechanisms of the type which are controlled by clutch assemblies in which the engagement of the clutch is controlled by an external pressure or vacuum signal.

As used above, the term "differential" merely refers to any device having an input and an output, wherein it is desirable to be able to control the relative rotation (or relative engagement) between the input and the output. However, the invention is especially suited for use with vehicle differentials of the bevel gear or planetary type, and will be described in connection therewith.

A vehicle differential in which the relative rotation between an input and one or more outputs is controlled by a clutch assembly is typically also referred to as a limited slip differential. Limited slip differentials are commonly used in both front and rear drive axle applications, to control or limit the slip between the input and the opposite axle shafts (outputs). However, limited slip differentials may also be used in inter-axle applications, as well as various other applications, and the present invention is not limited to any particular differential configuration or application. Clutch assemblies of the type used to control the relative rotation or slip in limited slip differentials may have the extent of their engagement controlled by some physical phenomenon such as the gear reaction forces within the differential gearing. However, there is a growing interest in being able to control such clutch assemblies in response to an external pressure signal (perhaps ultimately controlled by the vehicle microprocessor), and such clutches are typically referred to as "smart clutches".

One of the problems associated with the use of smart clutches for vehicle differentials is that full engagement of a typical multi-disc clutch pack may require an axial force of several thousand pounds which, in turn, would require hydraulic pressure of at least several hundred PSI. The use and control of such a pressure in a vehicle differential adds substantially to the cost and complexity of the entire system.

SUMMARY OF THE INVENTION

Accordingly, it is an object of the present invention to provide an improved clutch assembly for use with differential type devices wherein the clutch is of the type which is actuated in response to a remote pressure or vacuum signal, but without the need for relatively high pressure signals.

It is a more specific object of the present invention to provide an improved clutch assembly which achieves the above-stated object by directly controlling a low pressure to control indirectly the high pressure which actuates the clutch.

The above and other objects of the invention are accomplished by the provision of a clutch assembly of the type including housing means and an input member, the clutch assembly being adapted to retard rotation of an output member relative to the input member. The clutch assembly includes a first set of clutch discs fixed for rotation with the input member, and a second set of clutch discs fixed for rotation with the output member, the first and second sets of discs being interleaved and being normally in a disengaged condition. The clutch assembly further includes a clutch apply piston disposed within, and cooperating with the housing means to define a high pressure chamber. The clutch apply piston is disposed adjacent the clutch discs and is operable, in response to increasing pressure in the high pressure chamber, to apply an increasing force on the clutch discs, tending to bias the discs toward an engaged condition.

The improved clutch assembly is characterized by a low pressure piston disposed within, and cooperating with the housing means to define a low pressure chamber. The housing means includes means adapted to communicate between the low pressure chamber and a controllable source of low pressure fluid. The low pressure piston has a transverse area (A) exposed to the low pressure chamber, and a secondary piston portion extending axially therefrom, into the high pressure chamber. The secondary piston portion has a transverse area (B), the area (A) being substantially greater than the area (B).

In accordance with a further aspect of the present invention, a change in pressure in the low pressure chamber results in a greater change in pressure in the high pressure chamber, in a ratio approximately equal to the ratio of the transverse area (A) to the transverse area (B). Preferably, the ratio of the transverse area (A) to the transverse area (B) is equal to at least about 10:1.

DESCRIPTION OF THE PREFERRED EMBODIMENT

Figure 1:
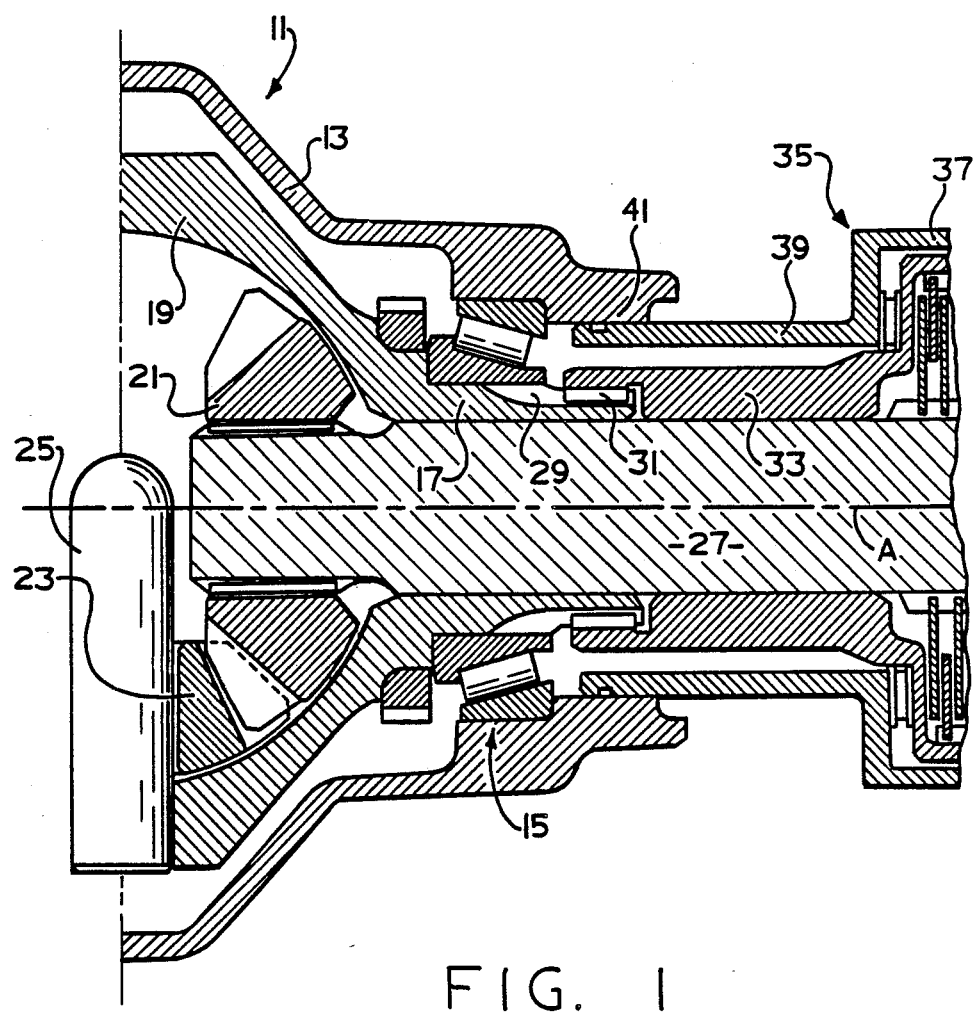
FIG. 1 is an axial half-section, illustrating a vehicle differential of the type with which the present invention maybe utilized.

Referring now to the drawings, which are not intended to limit the invention, FIG. 1 illustrates a vehicle differential of the general type illustrated and described in greater detail in U.S. Pat. No. 4,412,459, assigned to the assignee of the present invention and incorporated herein by reference.

FIG. 1 illustrates a differential assembly, generally designated 11, and including an outer differential housing 13. Seated within the housing 13 is the outer race of a bearing set 15, the inner race of which is disposed about a generally cylindrical hub 17 of a gear case 19. Although only a half section of the differential assembly 11 is shown in FIG. 1, it will be understood by those skilled in the art that some form of input drive is required, which typically would comprise a ring gear (not shown in FIG. 1) bolted to the left half of the gear case 19.

Disposed within the gear case 19 is a pair of side gears 21 (only one of which is shown in FIG. 1), and at least one pinion gear 23. Typically, there are two of the pinion gears 23, each of which is rotatably mounted about a pinion shaft 25, having its opposite ends extending through the gear case 19.

As is well known to those skilled in the art, when the gear case 19 is being driven by the input ring gear to rotate about an axis of rotation A, the case 19 drives the pinion shaft 25 and pinion gears 23 to rotate about the axis A, and also drives the side gears 21 to rotate about the axis A, with all of the elements just described rotating as a unit.

In splined engagement with the side gear 21 is an axle shaft 27 which is journaled within the hub 17. The outer periphery of the hub 17 includes a set of external splines 29, and in splined engagement therewith is a set of internal splines 31, formed on an inner periphery of a generally cylindrical clutch input member 33. As will be described in greater detail subsequently, the clutch input member 33 includes a portion extending into a clutch assembly, generally designated 35, which includes a clutch housing 37. The housing 37 includes a reduced diameter housing portion 39, which extends axially into a minimum diameter portion 41 of the differential housing 13.

Figure 2:
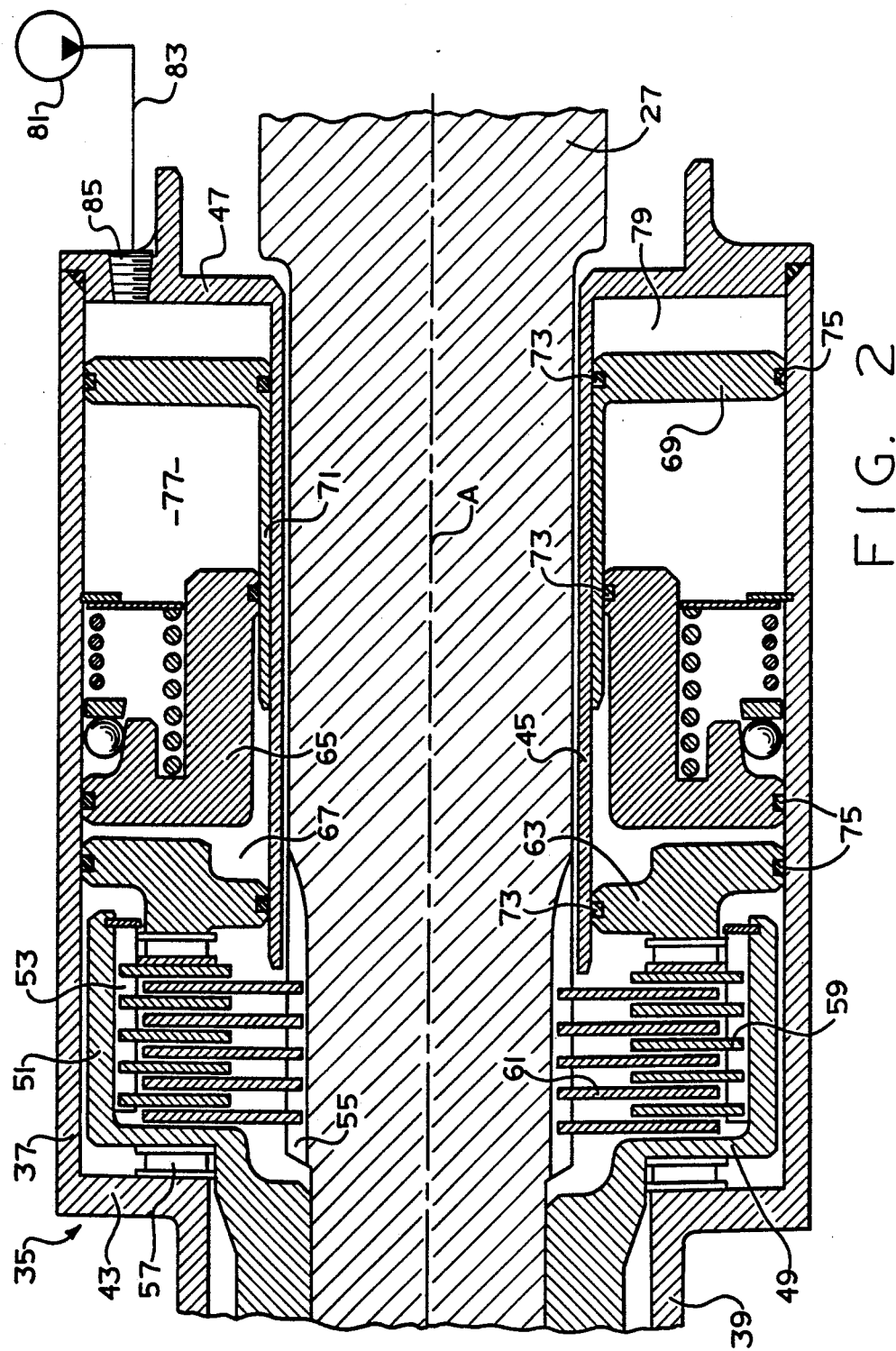
FIG. 2 is an enlarged, axial cross-section illustrating the improved clutch assembly of the present invention.

Referring now primarily to FIG. 2, the clutch assembly 35 will be described in greater detail. The clutch housing 37 includes a radial housing portion 43 (disposed toward the left end in FIG. 2), and an inner housing portion 45, which is generally cylindrical and surrounds the axle shaft 27, being closely spaced therefrom. The inner housing portion 45 includes a radial housing portion 47, integral therewith, the portion 45 preferably comprising one piece, separate from the housing 37, for ease of assembly.

The clutch input member 33 includes a radial wall portion 49, and integral therewith, a generally cylindrical input portion 51 which defines a plurality of internal splines 53. Disposed radially inwardly from the splines 53 is a set of external splines 55, formed about an enlarged portion of the axle shaft 27.

Disposed between the radial housing portion 43 and the radial wall portion 49 is a thrust bearing 57, the function of which will become apparent subsequently. Disposed within the input portion 51 is a first set of clutch discs 59 splined to the internal splines 53, and a second set of clutch discs 61, splined to the external splines 55. Although the particular configuration of the clutch discs 59 and 61 form no part of the present invention, it will become apparent to one skilled in the art that the present invention is intended for use with a clutch of the type which may have a disengaged condition (in which substantially no bias torque would be transmitted between the clutch input member 33 and the axle shaft 27); a fully engaged condition (no relative rotation between the input member 33 and the axle shaft 27); and an infinite number of engaged conditions (and bias torques) in between the two extremes.

Disposed between the clutch housing 37 and the inner housing 45 is a clutch apply piston 63 which cooperates with the housing 37 and housing 45 to define therein a pressure chamber, which is further separated into a plurality of distinct pressure chambers as will be described subsequently.

Disposed within the pressure chamber is an axially moveable chamber piston 65, which cooperates with the apply piston 63 to define therebetween a high pressure chamber 67. As will be readily apparent to those skilled in the art, variations in the pressure within the chamber 67 will result in a variable force acting on the apply piston 63, thus varying the axial force being exerted on the clutch discs 59 and 61, and the bias torque between the input member 33 and the axle shaft 27.

Also disposed within the pressure chamber is a low pressure piston 69, which includes a generally cylindrical portion 71, comprising a secondary piston, extending to the left in FIG. 2 from the main, annular part of the low pressure piston 69. Preferably, each of the pistons 63, 65, and 69 include inner and outer O-rings 73 and 75, respectively. Each of the outer O-rings 75 seals against the inner surface of the clutch housing 37. The inner O-rings 73 carried by the apply piston 63 and the low pressure piston 69 seal against the outer surface of the inner housing portion 45, whereas the inner O-ring 73, carried by the chamber piston 65, seals against an outer surface of the cylindrical portion 71, for reasons which will become apparent subsequently.

Figure 3:
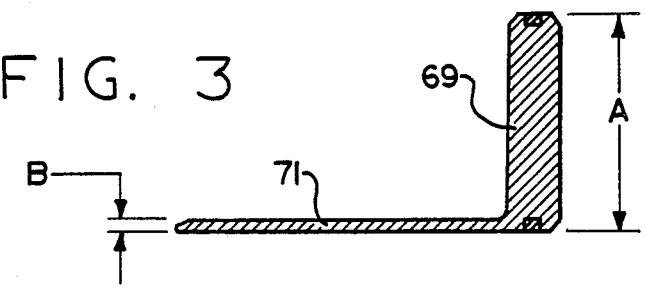
FIG. 3 is a view similar to FIG. 2, illustrating only the upper half of the low pressure piston, and the transverse areas thereof.

In a preferred embodiment of the present invention, the low pressure piston 69 cooperates with the chamber piston 65 to define a vented chamber 77 therebetween, while the low pressure piston 69 cooperates with the radial housing portion 47 to define a low pressure chamber therebetween. In this embodiment, the high pressure chamber 67 is a "sealed" chamber, i.e., it is not in communication with any external source of pressure, whereas the chamber 77 may be vented to the atmosphere by any suitable means (not shown), and the low pressure chamber 79 is in communication with an external source 81 of low fluid pressure, by means of a conduit 83 and a pipe fitting 85. It is an important aspect of the present invention to be able to control the pressure in the high pressure chamber 67, and thus, the amount of engagement of the clutch discs 59 and 61, simply by controlling the level of pressure within the low pressure chamber 79. Referring now to FIG. 3, there is an illustration of the low pressure piston 69, which has a transverse area proportional to its radial dimension A and is referred to hereinafter as transverse area (A). The cylindrical portion which extends axially into the high pressure chamber 67 has a transverse area proportional to its radial dimension B which is hereinafter referred to as the transverse area (B). Preferably, the area (A) should be 10 or 20 times greater than the area (B), in order to obtain substantial benefit from the present invention. In the subject embodiment, the ratio of the transverse area (A) to the transverse area (B) is 25:1.

As a result of the ratio between the areas (A) and (B), an increase of 1 PSI in the low pressure chamber 79 will move the low pressure piston 69 leftward in FIG. 2 a sufficient distance to cause an increase of 25 PSI in the high pressure chamber 67, thus resulting in a substantially amplified biasing force being exerted against the clutch discs 59 and 61.

Figure 4:
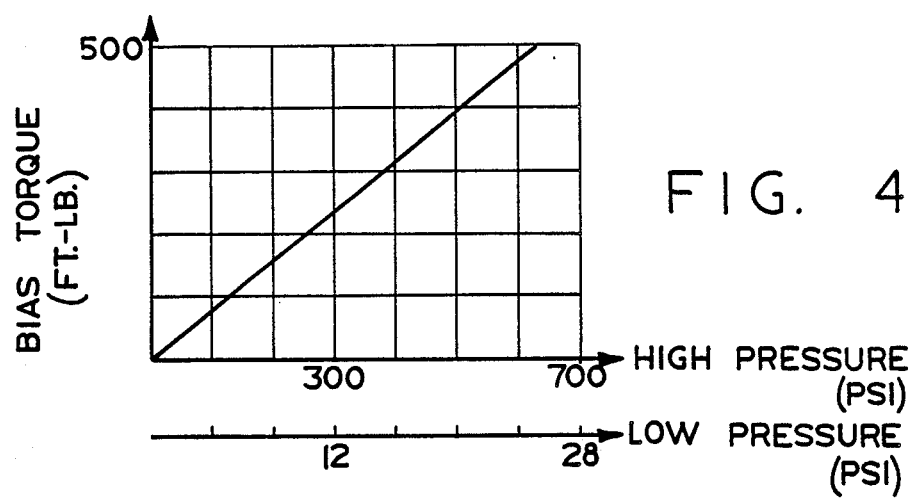
FIG. 4 is a graph of bias torque versus pressure (in both the high and low pressure chambers).

The amplifying effect of the present invention is illustrated in FIG. 4, which is a graph of bias torque (a measure of the engagement of the clutch discs 59 and 61) versus the pressure in the high pressure chamber 67, and also versus the pressure in the low pressure chamber 79. For example, the bias torque rises to nearly 400 ft.-lb. when the pressure in the chamber 67 is increased to approximately 500 PSI, which requires an increase in the pressure in the low pressure chamber to only about 20 PSI.

Figure 5:
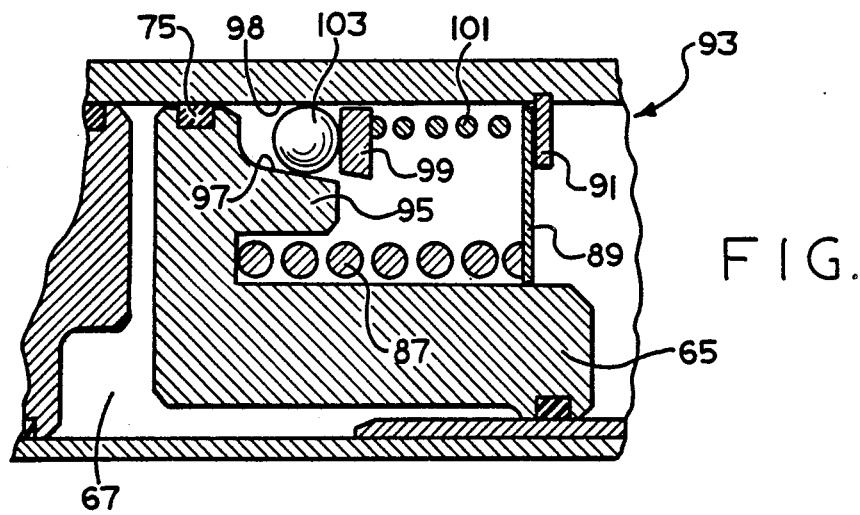
FIG. 5 is a further enlarged axial cross-section, similar to FIG. 2 illustrating the one-way clutch of the present invention.

The relatively long axial length of the clutch assembly 35 is a necessary result of the ratio of the area (A) to the area (B). For example, an increase in pressure sufficient to move the apply piston 63 to the left in FIG. 2 a distance of 0.010 inches would require an axial movement of the low pressure piston 69 to the left in FIG. 2 a distance of 0.250 inches. Furthermore, as the clutch discs 59 and 61 wear, the apply piston 63 will move further to the left, just to compensate for such wear, and the corresponding axial travel of the low pressure piston 69 would have to be 25 times as great as the movement of the apply piston 63, but for the presence of the chamber piston 65. Referring now to FIG. 5, as wear occurs, and the "nominal" or disengaged position of the apply piston 63 moves further to the left, the chamber piston 65 also moves to the left, under the biasing force of a helical compression spring 87, such that the volume of the high pressure chamber 67 remains substantially constant. The spring 87 has its left end seated against the chamber piston 65, and its right end seated against an annular washer 89 which, in turn, is seated against a snap ring 91.

As the chamber piston 65 moves leftward, to compensate for wear of the clutch discs, it must not thereafter move rightward again as pressure rises in the high pressure chamber 67. Therefore, in accordance with another aspect of the present invention, the chamber piston 65 is equipped with a one-way clutch mechanism, generally designated 93. The chamber piston 65 includes a generally annular projection 95, including an angled, annular outer surface 97. Disposed adjacent the projection 95 is an annular ring 99, biased leftward in FIGS. 2 and 5 by means of a helical compression spring 101. Trapped between the angled surface 97, an inner surface 98 of the housing 37, and the annular ring 99 is a plurality of clutch balls 103 which are constantly biased leftward in FIGS. 2 and 5 by the spring 101 to a position which ensures that the chamber piston 65 cannot thereafter move to the right in FIGS. 2 and 5, but can move only leftward. The ability of the chamber piston 65 to move leftward under the influence of the spring 87, and not subsequently move to the right because of the one-way clutch 93, makes it possible for the apply piston 63 to move to the left, and compensate for wear of the clutch discs 59 and 61, without the low pressure piston 69 having to move 25 times as far to maintain the pressure in the high pressure chamber 67.

Although the present invention has been described in connection with a preferred embodiment (as shown in FIG. 2), it should be understood that the invention could have various other embodiments. For example, the low pressure chamber 79 could be vented to the atmosphere, while the chamber 77 could be connected to a controllable source of vacuum and serve as the "low pressure chamber". Therefore, references herein, and in the claims, to "low fluid pressure" should be understood to mean and include either a positive fluid pressure or a vacuum.

The invention has been described in great detail in the foregoing specification, and it is believed that various alterations and modifications of the invention will become apparent to those skilled in the art from a reading and understanding of the specification. It is intended that all such alterations and modifications are included as part of the invention, insofar as they come within the scope of the appended claims.

I claim:
1. A clutch assembly of the type including housing means, and an input member, said clutch assembly being adapted to retard rotation of an output member relative to said input member; said clutch assembly including a first set of clutch discs fixed for rotation with said input member, and a second set of clutch discs fixed for rotation with said output member, said first and second sets of clutch discs being interleaved and being normally in a disengaged condition; said clutch assembly further including a clutch apply piston disposed within, and cooperating with said housing means to define a high pressure chamber, said clutch apply piston being disposed adjacent said clutch discs and operable, in response to increasing pressure in said high pressure chamber, to apply an increasing force on said clutch discs, tending to bias said clutch discs toward an engaged condition; characterized by:
   (a) a low pressure piston disposed within, and cooperating with said housing means to define a low pressure chamber;
   (b) said housing means including means adapted to communicate between said low pressure chamber and a controllable source of low pressure fluid;
   (c) said low pressure piston having a transverse area (A) exposed to said low pressure chamber; and
   (d) said low pressure piston including a secondary piston portion extending axially therefrom, into said high pressure chamber, and having a transverse area (B), said area (A) being substantially greater than said area (B).

2. A clutch assembly as claimed in claim 1 characterized by a change in pressure in said low pressure chamber results in a greater change in pressure in said high pressure chamber, in a ratio approximately equal to the ratio of said transverse area (A) to said transverse area (B).

3. A clutch assembly as claimed in claim 2 characterized by said ratio of said transverse area (A) to said transverse area (B) is equal to at least about 10:1.

4. A clutch assembly as claimed in claim 1 characterized by a chamber piston disposed within, and cooperating with said housing means to define said high pressure chamber, and further characterized by means biasing said chamber piston toward said clutch apply piston.

5. A clutch assembly as claimed in claim 4 characterized by said biasing means being selected whereby said chamber piston is moved to maintain a substantially constant volume in said high pressure chamber, for any given position of said low pressure piston, as wear occurs in said clutch discs.

6. A clutch assembly as claimed in claim 5 characterized by a one-way clutch means operably associated with said chamber piston whereby said chamber piston is permitted to be moved toward said clutch apply piston by said biasing means, but is prevented from moving away from said clutch apply piston.

7. A differential gear mechanism of the type including a gear case defining an axis of rotation (A) and a gear chamber; differential gear means disposed in said gear chamber, including at least one input pinion gear and at least one output side gear; and clutch means operable to retard relative rotation between said gear case and said side gear, said clutch means including a clutch housing; said clutch means including a first set of clutch discs rotationally fixed relative to said gear case, and a second set of clutch discs rotationally fixed relative to said side gear, said first and second sets of clutch discs being interleaved and being normally in a disengaged condition; said clutch means further including a clutch apply piston disposed within, and cooperating with said clutch housing to define a high pressure chamber, said clutch apply piston being disposed adjacent said clutch discs and operable, in response to increasing pressure in said high pressure chamber, to apply an increasing force on said clutch discs, tending to bias said clutch discs toward an engaged condition; characterized by:
  (a) a low pressure piston disposed within, and cooperating with said clutch housing to define a low pressure chamber;
  (b) said clutch housing including means adapted to communicate between said low pressure chamber and a controllable source of low pressure fluid;
  (c) said low pressure piston having a transverse area (A) exposed to said low pressure chamber; and
  (d) said low pressure piston including a secondary piston portion extending axially therefrom, into said high pressure chamber, and having a transverse area (B), said area (A) being substantially greater than said area (B), whereby a change in pressure in said low pressure chamber results in a substantially greater change in pressure in said high pressure chamber.

8. A clutch assembly as claimed in claim 7 characterized by said ratio of said transverse area (A) to said transverse area (B) is equal to at least about 10:1.

9. A clutch assembly as claimed in claim 7 characterized by a chamber piston disposed within, and cooperating with said clutch housing to define said high pressure chamber, and further characterized by means biasing said chamber piston toward said clutch apply piston.

10. A clutch assembly as claimed in claim 9 characterized by said biasing means being selected whereby said chamber piston is moved to maintain a substantially constant volume in said high pressure chamber, for any given position of said low pressure piston, as wear occurs in said clutch discs.

11. A clutch assembly as claimed in claim 10 characterized by a one-way clutch means operably associated with said chamber piston whereby said chamber piston is permitted to be moved toward said clutch apply piston by said biasing means, but is prevented from moving away from said clutch apply piston.

12. A clutch assembly of the type including housing means, and an input member, said clutch assembly being adapted to retard rotation of an output member relative to said input member; said clutch assembly including a first set of clutch discs fixed for rotation with said input member, and a second set of clutch discs fixed for rotation with said output member, said first and second sets of clutch discs being interleaved and being normally in a disengaged condition; said clutch assembly further including a clutch apply piston disposed within, and cooperating with said housing means to define a sealed high pressure chamber, said clutch apply piston being operably associated with said clutch discs and operable, in response to increasing pressure in said high pressure chamber, to apply an increasing force on said clutch discs, tending to bias said clutch discs toward an engaged condition; characterized by:
  (a) a low pressure piston disposed within, and cooperating with said housing means to define a low pressure chamber;
  (b) means, including said low pressure piston, operable in response to a change in pressure in said low pressure chamber, to effect a substantially greater change in pressure in said high pressure chamber;
  (c) a chamber piston disposed within, and cooperating with said housing means and said clutch apply piston to define said high pressure chamber;
  (d) means biasing said chamber piston toward said clutch apply piston; and
  (e) a one-way clutch means operably associated with said chamber piston whereby said chamber piston is permitted to be moved toward said clutch apply piston by said biasing means, but is prevented from moving away from said clutch apply piston.

13. A clutch assembly as claimed in claim 12 characterized by said one-way clutch means includes said chamber piston defining at least one angled surface disposed adjacent a surface of said housing means and angled away from said housing surface in a direction away from said high pressure chamber, and further including at least one clutch member disposed between said housing surface and said angled surface.

14. A clutch assembly as claimed in claim 13 characterized by said one-way clutch means includes means biasing said clutch member toward said high pressure chamber, into generally continuous engagement with said housing surface and said angled surface.

* * * * *